(12) United States Patent
Falcon et al.

(10) Patent No.: US 7,516,228 B2
(45) Date of Patent: *Apr. 7, 2009

(54) SYSTEMS AND METHODS FOR CONTROLLING THE NUMBER OF CLIENTS THAT ACCESS A SERVER

(75) Inventors: Stephen R. Falcon, Woodinville, WA (US); Vellore T. Vetrivelkumaran, Redmond, WA (US); Raju Gulabani, Redmond, WA (US); Neel Malik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

This patent is subject to a terminal disclaimer.

(21) Appl. No.: 10/997,239

(22) Filed: Nov. 24, 2004

(65) Prior Publication Data

US 2005/0102395 A1    May 12, 2005

Related U.S. Application Data

(63) Continuation of application No. 09/670,981, filed on Sep. 26, 2000, now Pat. No. 6,925,497.

(51) Int. Cl.
*G06F 15/16* (2006.01)
(52) U.S. Cl. .................. 709/229; 709/203; 709/225; 726/4
(58) Field of Classification Search ............. 709/203, 709/225, 229; 705/29, 59; 726/4
See application file for complete search history.

(56) References Cited

U.S. PATENT DOCUMENTS

| | | | |
|---|---|---|---|
| 5,276,795 | A | 1/1994 | Hoeber et al. |
| 5,544,048 | A | 8/1996 | Dugan et al. |
| 5,649,024 | A | 7/1997 | Goldsmith |
| 5,682,532 | A | 10/1997 | Remington et al. |
| 5,694,151 | A | 12/1997 | Johnston, Jr. et al. |
| 5,771,384 | A | 6/1998 | Remington et al. |
| 5,802,534 | A | 9/1998 | Hatayama et al. |
| 5,835,769 | A | 11/1998 | Jervis et al. |

(Continued)

OTHER PUBLICATIONS

Appenzeller; "User-friendly access control for public network ports", INFOCOM '99. 18th Annual Joint Conference of the IEEE Computer and Communications Societies. Proceedings IEEE, Mar. 21-25, 1999, NYC, pp. 699-707.

(Continued)

*Primary Examiner*—David Lazaro
(74) *Attorney, Agent, or Firm*—Lee & Hayes, PLLC

(57) ABSTRACT

Systems and methods for controlling the number of clients that can access a server in a server-client network are described. A communications filter driver resides on the server and monitors network communications to determine a unique network address of each client that attempts to access the server. A table of clients that have accessed the server is stored at the server. When a client attempts to access the server, the server allows the client to access the server if the network address of the client is listed in the table. If the network address of the client is not listed in the table, the server determines if a client limit has been met or exceeded. If the limit has not been met, the client is allowed to access the server and the Internet address of the client is added to the table.

19 Claims, 4 Drawing Sheets

U.S. PATENT DOCUMENTS

| | | | |
|---|---|---|---|
| 5,867,144 A | 2/1999 | Wyard | |
| 5,884,024 A | 3/1999 | Lim et al. | |
| 5,890,177 A | 3/1999 | Moody et al. | |
| 5,930,813 A | 7/1999 | Padgett et al. | |
| 5,956,736 A | 9/1999 | Hanson et al. | |
| 6,035,119 A | 3/2000 | Massena et al. | |
| 6,061,696 A | 5/2000 | Lee et al. | |
| 6,101,509 A | 8/2000 | Hanson et al. | |
| 6,173,337 B1 | 1/2001 | Akhond et al. | |
| 6,240,430 B1 | 5/2001 | Deike et al. | |
| 6,253,236 B1 * | 6/2001 | Troxel et al. | 709/217 |
| 6,256,739 B1 | 7/2001 | Skopp et al. | |
| 6,268,852 B1 | 7/2001 | Lindhorst et al. | |
| 6,289,450 B1 | 9/2001 | Pensak et al. | |
| 6,327,254 B1 | 12/2001 | Chuah | |
| 6,337,696 B1 | 1/2002 | Lindhorst et al. | |
| 6,442,588 B1 * | 8/2002 | Clark et al. | 709/203 |
| 6,480,206 B2 | 11/2002 | Prinzing | |
| 6,518,989 B1 | 2/2003 | Ishikawa | |
| 6,714,219 B2 | 3/2004 | Lindhorst et al. | |

OTHER PUBLICATIONS

Walkowski, "10 Minute Guide to WordPerfect 5.1 for Windows", Copyright 1992.

Simpson, "Mastering WordPerfect for Windows", Sybex, 1993, 25 pages.

Neibauer, "The ABC's of WordPerfect *," 1997; Sybex; Second Edition, pp. 29-30 and 89-90.

* cited by examiner

SYSTEMS AND METHODS FOR CONTROLLING THE NUMBER OF CLIENTS THAT ACCESS A SERVER

RELATED APPLICATION

This application claims priority to U.S. Pat. No. 6,925,497 issued to Vetrivelkumaran et al with an issue date of Aug. 2, 2005.

TECHNICAL FIELD

The systems and methods described herein relate to server-client network systems. More particularly, the described implementations relate to controlling the number of unique clients that can access server software in a server-client network.

BACKGROUND

Developers of operating systems and software applications require that users of these systems have a license to use the system. The license indicates that the user has paid for the right to use the software. Business enterprises that license software for use in enterprise systems usually enter into a concurrent access license with the software developer. A concurrent users license allows a limited number of unique users to use the software. Such licenses, however, can be virtually impossible to enforce.

Some network software systems are configured to allow only a certain number of users to access the software at the same time. For example, an operating system may be configured to allow only ten users to access the operating system at any given time. However, limiting access to ten users at the same time does not necessarily limit access to the operating system to ten unique users. Typical use of a system will see many users logging on and off a system for various periods throughout a day. One user may log onto the system for ten minutes and log off. Another user may log on for an hour before logging off. Therefore, it is possible that many more than ten users may access a system even though no more than ten users are logged onto the system at any given time.

Furthermore, software developers sometimes develop smaller versions of large software packages. These smaller versions—which are less expensive than the larger versions—are targeted for small businesses that do not need the capabilities of the larger version or that may not be able to afford the larger systems. If the software developer cannot limit the number of unique users that access the system, then a larger enterprise may use a version that was designed for a smaller enterprise and avoid using a more costly software package. Such misuse by an enterprise harms the software developer.

SUMMARY

Methods and systems are described herein that limit the number of clients that can access server software to a predefined limit. A server operating system—or other software system running on a server—includes a communications protocol filter that monitors transmissions between the server and multiple clients connected to the server via a network.

When the communications filter detects a packet header that identifies a client attempting to connect to the server, the communications filter identifies a network address associated with the client from the packet and attempts to locate the network address in a table that contains a network address for each client that has previously accessed the server. If the network address for the client is in the table, then the server processes the communications packets received from the client.

If the network address for the client is not listed in the table, then the server references a client limit field in server memory. The client limit field contains a configurable client limit value that denotes the number of clients that are allowed to access the server. The client limit value is encrypted to prevent illegal alteration of the client limit. If the number of entries in the table is less than the value in the client limit field (i.e., the number of clients having access to the server is less than the allowable limit), then the client is allowed to access the server and the network address for the client is added to the table.

In some systems, a network address that is assigned to a client may expire after a certain period, such as when the client has been inactive for a certain period of time. When the client becomes active again, a new network address is assigned to the client. Often, the new network address will be identical to the original network address, but there are cases when the network addresses are different.

To accommodate these types of systems, access to the server is not simply denied if the number of client network addresses in the table meets or exceeds the client limit. If the number of network addresses in the table is greater than or equal to the client limit when a client attempts to access the server, and the client's network address is not in the table, the communications filter determines if the client requesting server access is a previous client that has a new network address. In one implementation, the communications filter transmits a signal to each network address that is listed in the table. If a client at a network address does not respond to the signal, the communications filter assumes that the network address that does not provide a response is an old network address of the client attempting to access the system. Therefore, it removes the old network address from the table, inserts the network address of the client requesting access into the table, and allows the client to access the server. If, however, all network addresses respond to the signal, then the client limit has been reached and allowing access to the requesting client would exceed the limit. The client is, therefore, denied access to the server and a 'limit exceeded' event occurs. Upon occurrence of this event, a signal is sent to indicate that the client limit has been exceeded and the packet is not processed.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
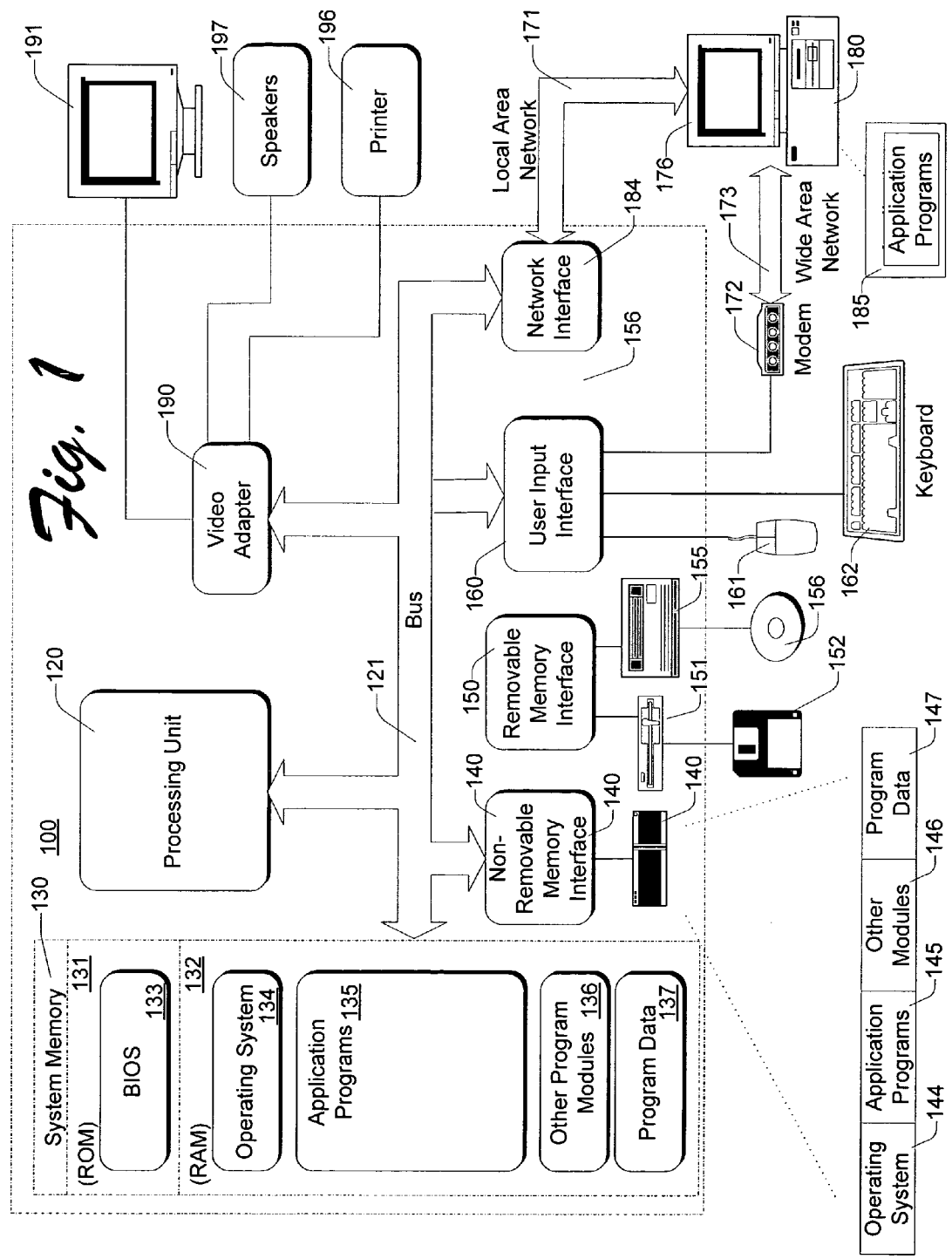
FIG. 1 is an exemplary computer system on which the present invention may be implemented.

The invention is illustrated in the drawings as being implemented in a suitable computing environment. Although not required, the invention will be described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Computer Environment

The various components and functionality described herein are implemented with a number of individual computers. FIG. 1 shows components of typical example of such a computer, referred by to reference numeral 100. The components shown in FIG. 1 are only examples, and are not intended to suggest any limitation as to the scope of the functionality of the invention; the invention is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
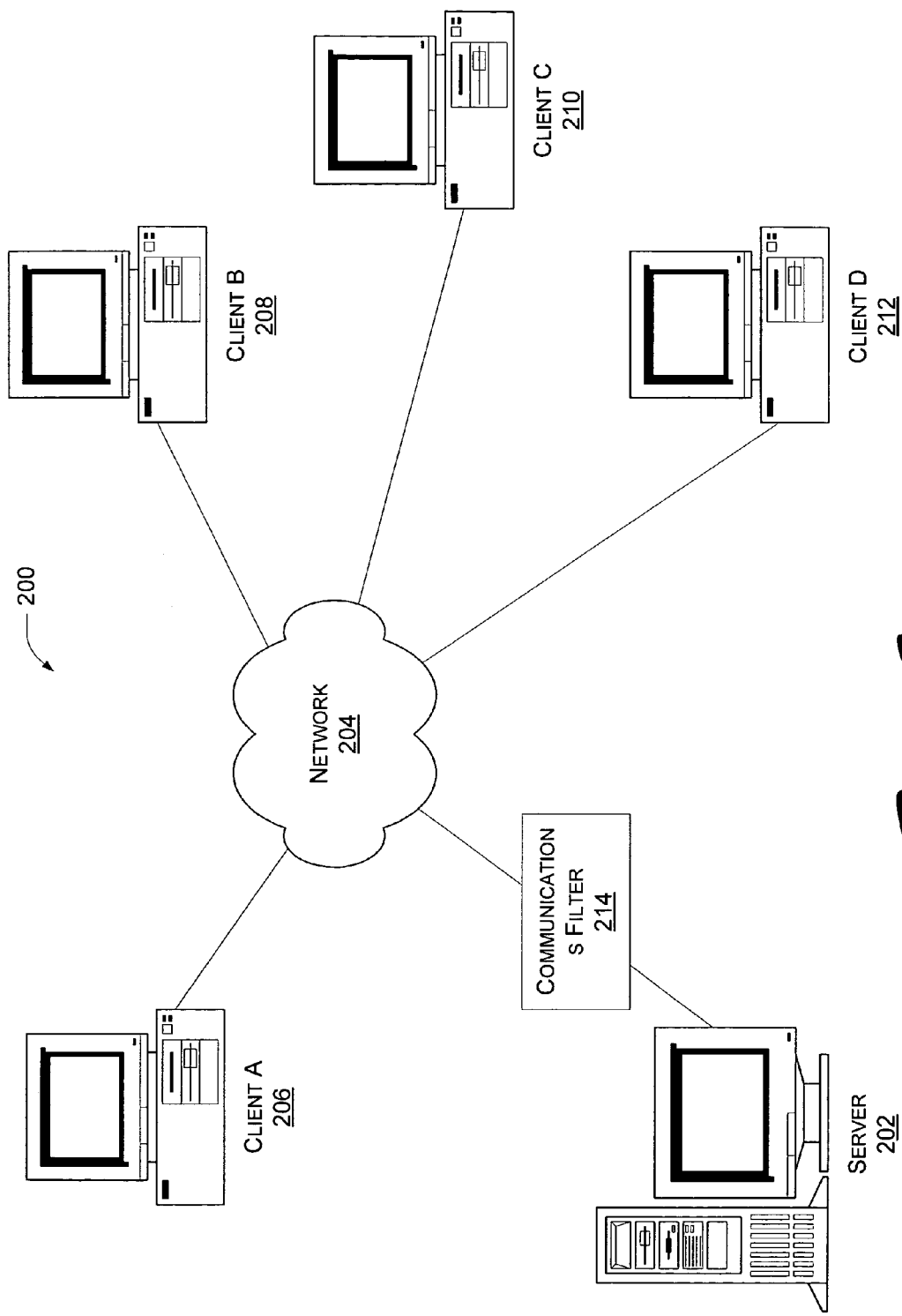
FIG. 2 is an illustration of a server having a communications filter, the server communicating with several clients over a network.

FIG. 2 is a simplified illustration of a computer network system 200 that implements one or more of the described implementations. The computer network system 200 includes a server 202 and several client computers that communicate with the server 202 over a network 204. For purposes of the present discussion, the network 204 is a local area network (LAN), although other types of networks may be used. Client A 206, Client B 208, Client C 210 and Client D 212 are connected to the network 204. Communications with the server 202 are directed through a communications filter 214, which controls the number of clients that can access the server or utilize software on the server. The communications filter 214 monitors communications between the server 202 and the client computers 206-212 and is configured to identify a network address for each of the clients 206-212 that communicate with the server 202.

Although the communications filter 214 is shown as being separate from the server 202, the communications filter 214 may be located on the server 202 or on a peripheral unit connected to the server 202. Generally, the communications filter 214 may be located anywhere that it can monitor communications between the server 202 and the clients 206-212 and where a client cannot bypass the communications filter 214 to communicate with the server 202.

The communications filter 214 may control access to the server 202 itself (i.e., to a server operating system), to a software application stored on the server 202, or to a hardware device (not shown) that is connected to the server 202. The present discussion will focus on a communications filter that is configured to limit the number of unique clients that can access and utilize a server operating system. Also, for purposes of the present discussion, reference made to accessing the server will mean accessing an operating system on the server 202.

Figure 3:
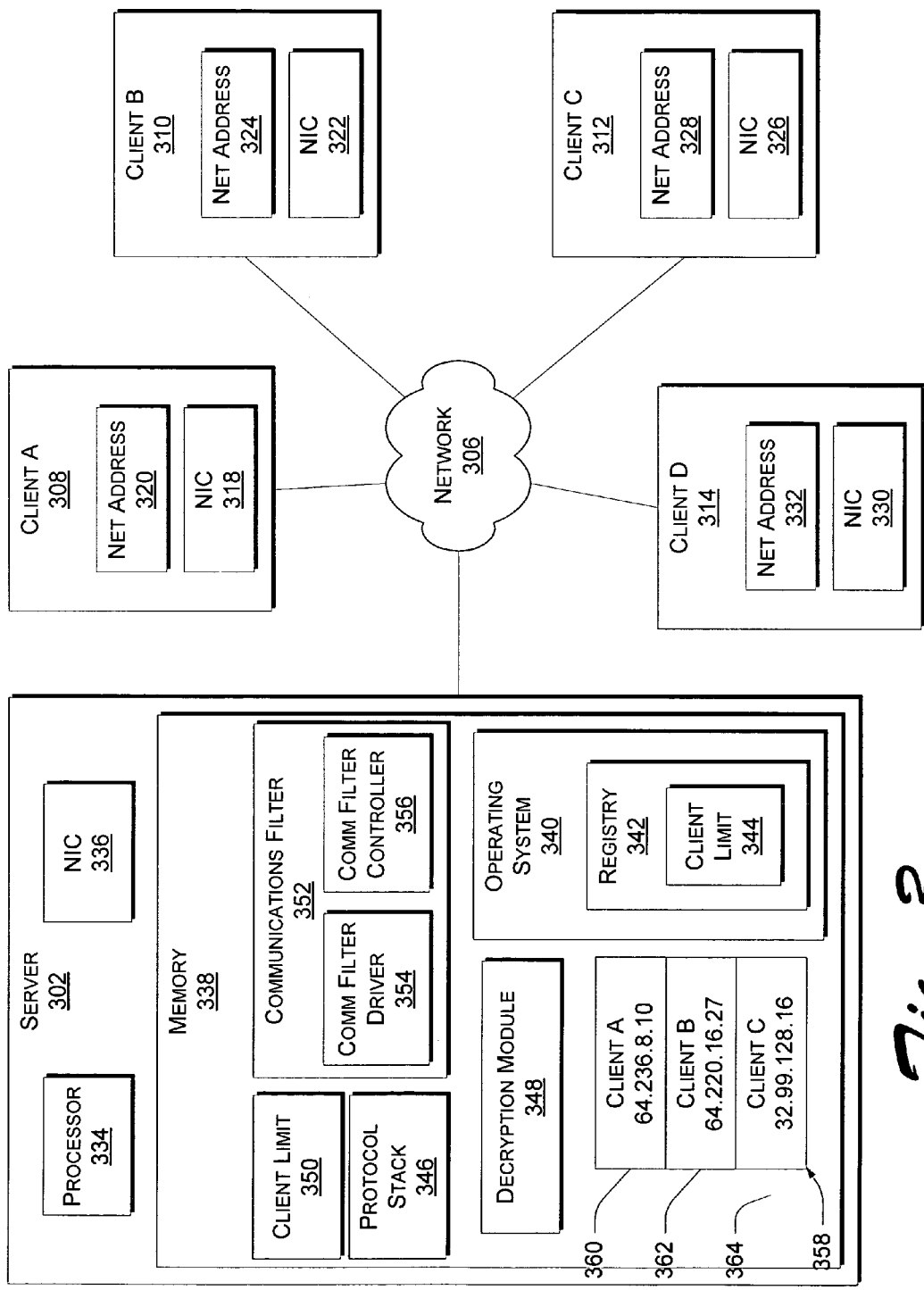
FIG. 3 is a block diagram of a server-client network system implemented in accordance with the described embodiments.

FIG. 3 is a block diagram of a server-client network system 300 implemented in accordance with the described embodiments. The system 300 includes a server 302 that communicates with a network 306. Client A 308, client B 310, client C 312 and client D 314 communicate with the server 302 via the network 304. It is noted that, although only four clients are shown that communicate with the server 302, virtually any number of clients can communicate with the server 302. The number of clients accessing the server 302 is limited in the present invention only by a communications filter, which will be discussed in greater detail below.

Client A 308 includes a network interface card 318 (NIC) that is used to connect client A 308 to the network 306. Client A 308 also has a network address 320 that uniquely identifies client A 308 on the network 306. Client B 310 includes a network interface card 322 that connects client B 310 to the network 306. Client B 310 also has a network address 324 that uniquely identifies client B 310 on the network 306. Client C 312 includes a network interface card 326 to connect client C 312 to the network 306. Client C 312 also has a network address 328 that uniquely identifies client C 312 on the network 306. Client D 314 includes a network interface card 330 and has a network address 332 that uniquely identifies client D 314 on the network 306.

The server 302 includes a processor 334, a network interface card 336 and memory 338. The processor 334 is a central processing unit that is configured to execute processor-executable instructions. The network interface card 336 provides an interface between the server 302 and the network 306. The server 302 communicates with the network 306 using standard TCP/IP (Transmission Control Protocol/Internet Protocol) communications protocol.

It is noted that, although the server 302 is shown communicating via the network 306 using TCP/IP, the server 302 may also communicate over any network—such as a wide area network (WAN)—utilizing any appropriate protocol. The server 302 may also be configured to use a method other than a network interface card to interface with the network 306. For example, the server 302 may utilize a modem (not shown) to communicate with client computers in a wide area network.

The memory 338 includes an operating system 340, which has a global system registry 342. A client limit 344 is stored in the registry 342 and is, therefore, available for retrieval by various software applications. The client limit 344, as will be discussed in greater detail below, is a value that specifies a maximum number of unique clients that can access the server 302. For purposes of discussion, accessing the server 302 means accessing and utilizing the operating system 340, although the described implementations could be used to limit access to the server 302, a software application resident on the server 302, or some piece electronic hardware unit. The client limit 344 is the number of users allowed by, for example, a concurrent users license. The client limit 344 is preferably configurable, so that a software designer or vendor can customize the client limit for each particular server. The configurable client limit 344 can be set to different limits on different server products.

The memory 338 also includes a protocol stack 346 that is used to process communication protocol commands received from one or more clients 308-314. The protocol stack 346 includes related communication protocol layers stacked on top of each other (data products, sessions, etc.).

A decryption module 348 resides in the memory 338 and is used when the client limit 344 is stored in an encrypted form. The encrypted client limit 344 is decrypted by the decryption module 348 and is stored in the memory as client limit 350. The decrypted client limit 350 is used in subsequent processing. In an alternative implementation, the decryption module 348 decrypts the encrypted client limit 344 whenever the client limit 344 is used in processing. However, it is preferable to utilize a decrypted client limit 350 in processing, as this economizes computational overhead.

The memory 338 also includes a communications filter 352 that is configured to limit the number of clients that can access the server 302 to the value indicated by the client limit 350. The communications filter 352 consists of a communications filter driver 354 and a communications filter controller 356. The communications filter driver 354, as will be discussed below, is configured to signal an event when the client limit 350 is exceeded. The communications filter controller 356 initializes the communications filter driver 354 and retrieves the client limit 350 (or the client limit 344 in the registry 342). The communications filter controller 356 is additionally configured to send a signal to all clients that have previously accessed the operating system 340 and monitor for a response from each client. The purpose of this function will be discussed in detail, below.

It is noted that the preferred implementation, as described below, will identify the tasks that are allocated to and performed by the communications filter controller 356. However, it is noted that the communications filter controller 356 may also be configured to perform other tasks described in the following discussion, although such other tasks may not be specifically recited as being performed by the communications filter controller 356.

The communications filter driver 354, when initialized with the client limit 350, creates a client table 358 having a number of entries equal to the number of unique users allowed to access the operating system 340 under the applicable users license. The communications filter driver 354 then registers with the communications stack 346 to receive notification on every incoming packet on the local network interface card 336 (the local NIC is the network interface card through which clients on the network 306 connect to the server 302). The remaining functions of the communications filter driver 354 will be discussed in greater detail, below, with reference to FIG. 4.

The client table 358 has one entry available for each unique user that accesses the operating system 340. For example, if the client limit 350 is twenty-five (25), then the client table 358 will consist of twenty-five (25) entries, or rows. As shown in FIG. 3, the client table 358 comprises three (3) rows: row 360, row 362 and row 364. For purposes of this example, it is assumed that the client limit is three (3), although the client limit 350 could be virtually any number. In the present example, row 360 contains a network address associated with and uniquely identifying client A 308. The network address associated with client A 308 is 64.236.8.10. Row 362 contains a network address associated with client B 310, and row 364 contains a network address associated with client C 312. The network address for client B 310 is 64.220.16.27, and the network address assigned to client C 312 is 32.99.128.16.

It is noted that the network addresses stored in row 360, row 362 and row 364 will not actually be stored in the rows until client A, client B and client C are granted access to the operating system 340. However, for convenience purposes, the network addresses are shown stored in the rows 360-364. The process by which the network addresses are stored is discussed in detail, below, with reference to FIG. 4.

Figure 4:
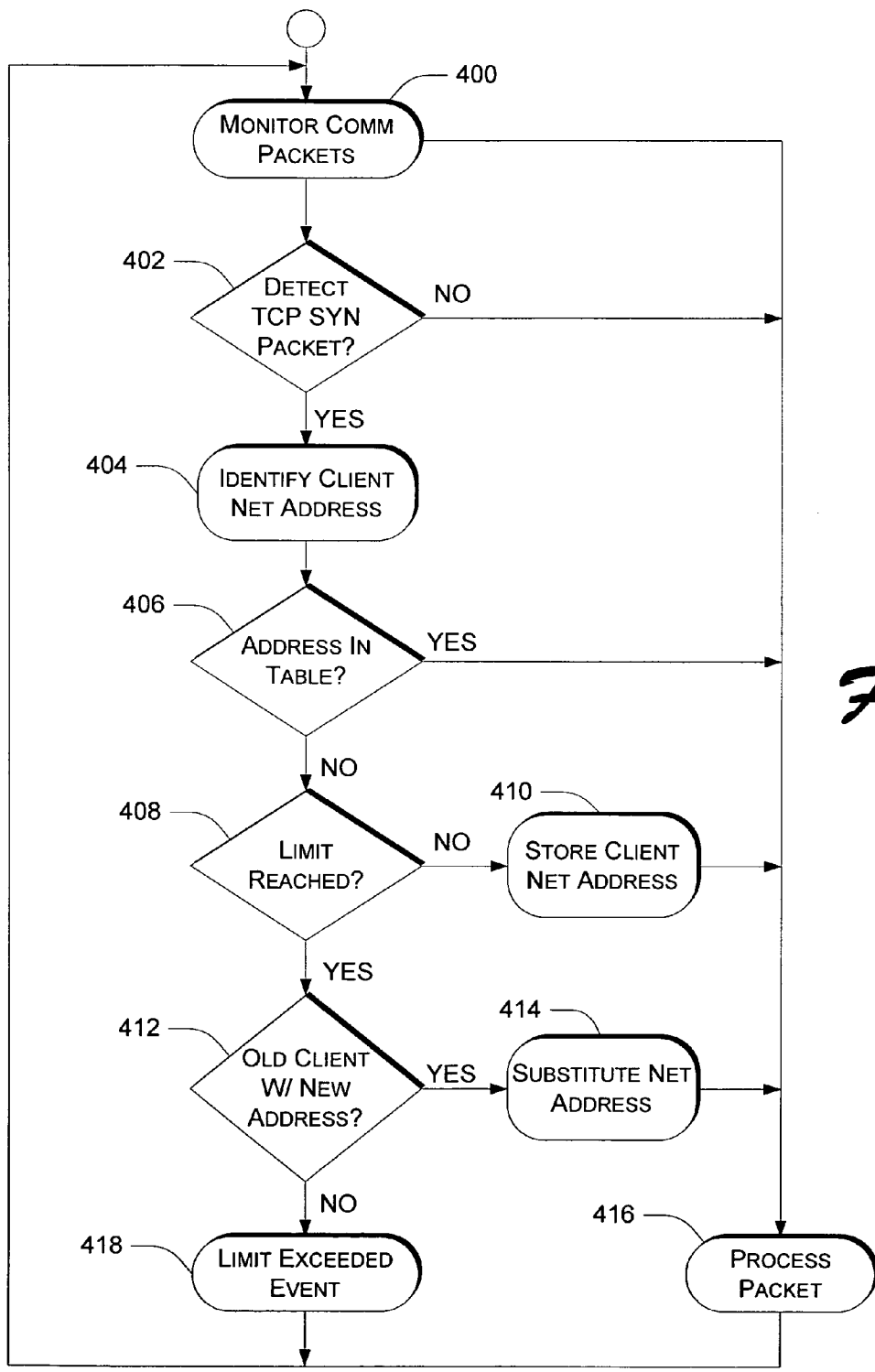
FIG. 4 is a flow diagram outlining a method for controlling the number of clients having access to a server in a server-client network system.

FIG. 4 is a flow diagram that depicts a method in accordance with the present invention. At step 400, the communications filter driver 354 monitors incoming communications packets that are sent across the local network interface card 336. If a communications packet is a packet is a session initiation packet—such as a TCP SYN (TCP synchronization) packet—("Yes" branch, step 402), then the network address is identified from the communications packet at step 404. If the communications packet is not a session initiation packet—such as a TCP SYN packet—("No" branch, step 404), then it is assumed that the client has previously accessed the server 302, and the packet is processed at step 416.

It is noted that the communications filter driver 354 could examine all communications packets received from a client. However, for performance reasons, in the preferred implementation only the session initiation packets are inspected to determine the network address of a sending client.

Once, the network address has been determined from the packet, the communications filter driver 354 determines if the network address is listed in the client table 358. For discussion purposes, assume that at this point, the client table 358 contains no entries and that client A 308 has sent a TCP SYN packet to the server 302. At step 406, the communications filter driver 354 searches the client table 358 for the network address 320 of client A 308 (64.236.8.100). If the network address for client A 308 is found in the client table 358 ("Yes" branch, step 406), then client A 358 is allowed to access the server 302 and the packet is processed at step 416. But in this example, the client table 358 is empty so no match is found for the network address 320 of client A 308 ("No" branch, step 406).

At step 408, the communications filter driver 354 determines if the maximum number of clients that are allowed to access the operating system 340 has been reached. The client limit 350 is retrieved from memory 338. If the number of entries in the client table 358 is less than the client limit 350 ("No" branch, step 408), then the network address 320 for client A 308 is stored in the client table 358 at row 360 (step 410) and the packet is processed at step 416.

At this point, client A 308 has access to the server operating system 340. Continuing with the example, now assume that client B 310 attempts to access the operating system 344 of the server 302. At step 402, the communications filter driver 354 detects a data packet that includes the network address 324 of client B 310. The network address 324 is identified at step 404 and, at step 406, the communications filter driver 354 compares the network address 324 for client B 310 (64.220.16.27) to the entries in the client table 358 in an attempt to find a match. Since client B 310 has not previously accessed the operating system 344, the communications filter determines if the client limit 350 has been reached by comparing the number of entries in the client table 358 to the client limit 350. In this example, the client limit 350 is three (3) and the number of entries in the client table 358 is one (client A). Therefore, the limit has not been reached ("No" branch, step 408) and the network address 324 for client B 310 is stored in the client table 358 at step 410. The communications packets received from client B 310 are processed at step 416.

At this point, client A 308 and client B 310 have access to the server operating system 340, and the network addresses 320, 324 for client A 308 and client B 310 are stored in the client table 358. Continuing with the example, client C 312 attempts to access the operating system 344 of the server 302. At step 402, the communications filter driver 354 detects a data packet that includes the network address 328 of client C 312. The network address 328 is identified at step 404 and, at step 406, the communications filter driver 354 compares the network address 328 for client C 312 (126359.44.33) with the entries in the client table 358 to find a match. Since client C 312 has not previously accessed the operating system 344, the communications filter determines if the client limit 350 has been reached by comparing the number of entries in the client table 358 to the client limit 350. The client limit 350 is three (3) and the number of entries in the client table 358 is now two (clients A and B). Therefore, the client limit has not been reached ("No" branch, step 408) and the network address 328 for client C 312 is stored in the client table 358 at step 410. The communications packets received from client C 312 are processed at step 416.

Assume now that client D 314 attempts to communicate with the operating system 344 of the server 302. At step 402, the communications filter driver 354 detects a TCP SYN packet sent from client D 314 and the network address 332 for client D 314 is identified. The network address 332 for client D 314 is not in the client table 358 ("No" branch, step 406), so the client limit is checked at step 408. Now, the number of entries (or network addresses) in the client table 358 is three, which is equal to the client limit 350. Therefore, client D 314 is not immediately allowed access to the operating system 344.

As previously discussed, there are some systems that are configured to reassign a network address for a client when the network address for the client has expired for one of various reasons. For example, a system might reclaim a network address from a client if the client has not been active for a certain period of time. If the client becomes active again at a later time, the system assigns a new network address to the client. This new network address may be identical to the original network address, but it can be a different network address. Therefore, the present invention must accommodate this type of scheme.

At step 412, the communications filter driver 354 attempts to determine if client D 316 has previously accessed the operating system 344 using a different network address. If client D 316 has previously accessed the server 302 using a different network address ("Yes" branch, step 412), then the new network address used by client D 314 is substituted for the old network address used by client D 314 (step 414). But if client D 314 has not previously accessed the server 302, then at step 418, a limit exceeded event is initiated wherein the communications filter driver 354 notifies the communications filter controller 356 that the limit has been exceeded. The communications filter controller 356 sends a "limit exceeded" signal to the operating system 340 (and which is ultimately sent to the client) and the packet is dropped. In other words, client D 316 is not allowed to communicate with the server 302.

One way in which the communications filter 352 determines if the new client (client D 316) has previously accessed the server 302 is by the communications filter controller 356 sending a signal to each network address listed in the client table 358. If a client at one network address fails to acknowledge the signal, then the communications filter controller 356 assumes that the network address is no longer valid and, therefore, another client may access the server 302 within the client limit 350. When a response is not received from a network address, the communications filter controller 356 removes the non-responsive network address from the client table 358 and inserts the new network address in its place (step 414). Therefore, the client limit 350 is still not exceeded.

It is noted that a client may not respond because it has been temporarily shut down. If so, then it is theoretically possible to exceed the client limit. However, it would be very inconvenient for users to do this simply to exceed a concurrent users license and it is only a small probability that such a technique would, in practice, actually be used to exceed the limit. That notwithstanding, the described implementations still provide a reliable, practical technique for keeping the number of clients that access the server within the client limit.

Conclusion

The systems and methods described herein provide a practical way to limit the number of clients that can access a server in a server-client network system. The server keeps track of each network address from which it is accessed and denies access to any client that attempts to access the server after the maximum number of clients have accessed the server.

Systems that allow network address to expire and that reassign network addresses to existing clients can be implemented as well. When a client attempts to access the server when the client limit has been reached, the server signals each network address that identifies a client having access to the server. If a network address does not acknowledge the signal, then the server assumes that the network address is no longer in use, and the server allows another client to access the server.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. An Internet protocol (IP) filter stored on a computer-readable storage medium, comprising processor-executable instructions that, when executed, cause a processor to perform the following steps:
   monitoring internet protocol data packets transmitted from one or more clients to a server;
   obtaining a first network address from an IP data packet transmitted by a first client;
   processing IP data packets from the first client if a first Network address that is uniquely associated with the client is stored in a client table, the client table comprising Network addresses associated with one or more clients wherein each associated client has previously had IP data packets processed;

retrieving a client limit value from a client limit field if the first Network address is not stored in the client table, the client limit value indicating a maximum number of unique clients for which IP data packets can be processed;

determining if the first client is represented in the client table by a second Network address that is different from the first Network address if the number of Network addresses in the client table is greater than or equal to the client limit value; and processing IP data packets from the first client if the second Network address is found in the client table.

2. The Internet protocol filter as recited in claim 1, further comprising processor-executable instructions that, when executed on a processor, perform the following steps:

storing the first Network address in the client table.

3. The Internet protocol filter as recited in claim 1, further comprising processor-executable instructions that, when executed on a processor, perform the following steps:

removing the second Network address from the client table; and inserting the first Network address into the client table.

4. The Internet protocol filter as recited in claim 1, wherein obtaining a first network address from an IP data packet comprises:

determining if the IP data packet is a session initiation packet; and identifying the first network address from the communications packet only if the IP data packet is a session initiation packet.

5. A method, comprising:

detecting when a first client attempts to establish a connection with a server;

determining a first client identifier and a second client identifier that are each associated with the first client;

storing the first client identifier and the second client identifier in a client table if the first client has established a connection with the server;

determining if a total number of previous clients having access to the server is less than a client limit, each previous client having a unique identifier;

searching the client table for the first client identifier and the second client identifier associated with the first client to determine if the first client has previously been allowed to access the server, the first client having been previously allowed to access the server if either the first client identifier or the second client identifier is found in the client table;

providing access to the server if the total number of previous clients having access to the server is less than a client limit;

providing access to the server if the total number of previous clients is greater than or equal to the client limit and if the first client has previously been allowed to access the server; and storing the first client identifier and the second client identifier associated with the first client in memory if access is provided to the first client.

6. The method as recited in claim 5, wherein the determining if a total number of previous clients having access to the server is less than a client limit further comprises:

determining how many unique identifiers are stored in memory; and comparing the number of unique identifiers in memory with the client limit.

7. The method as recited in claim 5, wherein the searching the client table for the first client identifier and the second client identifier associated with the first client to determine if the first client has previously been allowed to access the server is performed if the total number of previous clients having access to the server is greater than or equal to the client limit.

8. The method as recited in claim 5, wherein the searching the client table for the first client identifier and the second client identifier associated with the first client to determine if the first client has previously been allowed to access the server further comprises:

comparing the first client identifier and the second client identifier of the first client with the unique identifiers of each previous client that has been allowed to access the server;

determining that the first client has previously been allowed to access the server if the first client identifier matches a previous client identifier.

9. A server that provides access to a limited number of clients, comprising:

memory;

a network interface to handle communications between the server and a plurality of clients;

an operating system stored in the memory;

a client limit stored in the memory, the client limit denoting a number of unique clients that are allowed to access the server;

an IP stack in the memory to process data packets transmitted from clients;

a client table in the memory to store a unique Network address for each client that accesses the server;

a communications filter to allow access to a first client if the total number of clients that have accessed the server is less than the client limit, or if the total number of clients that have accessed the server is greater than or equal to the client limit and the first client has previously accessed the server, wherein the Communications filter is further to:

search the client table for a first Network address associated with the first client and determine that the first client has previously accessed the server if the first Network address is found in the client table; and search the client table for a second Network address associated with the first client and determine that the first client has previously accessed the server if the second Network address is found in the client table.

10. An operating system stored on a computer-readable storage medium, the operating system comprising:

an IP stack for processing Internet protocol data packets received from multiple clients;

a client limit field containing a client limit value that denotes a maximum number of clients that may access the IP stack;

a client table containing a unique Network address for each client that has accessed the operating system, the client table comprising Network addresses associated with one or more clients wherein each associated client has previously had IP data packets processed;

a communications filter to determine a first Network address of a first client attempting to access the operating system, search the client table for the first Network address, and allow the first client to access the operating system if the first Network address is found in the client table, wherein the Communications filter is further to allow the first client to access the operating system if the number of Network addresses in the client table is greater than or equal to the client limit value and the first client has previously accessed the operating system using a second Network address that is stored in the client table.

11. The operating system as recited in claim 10, wherein the Communications filter is further to:
allow the first client to access the operating system if the number of Network addresses in the client table is less than the client limit value; and
store the first Network address in the client table if the first client is allowed to access the operating system.

12. A computer-readable storage medium comprising computer-executable instructions that, when executed on a computer, perform the following steps:
determining a first Internet Protocol (IP) address and a second IP address transmitted from a first client to a server;
searching a client table for the first IP address, the client table comprising IP addresses associated with one or more clients wherein each associated client has previously accessed the server;
searching the client table for the second IP address associated with the first client;
allowing the first client to access the server if the first IP address is found in the client table; and
allowing the first client to access the server if the second IP address is found in the client table and if the number of IP addresses in the client table is greater than or equal to a client limit value.

13. The computer-readable medium as recited in claim 12, further comprising computer-executable instructions that, when executed on a computer, perform the following steps:
determining if a client limit has been reached, the client limit indicating a total number of clients that can access the server;
allowing the first client to access the server if the client limit has not been reached; and
inserting the first IP address and the second IP address into the client table.

14. A computer system, comprising:
a processor;
a network interface card to handle communications with multiple clients;
memory;
a global system registry;
a client table having one entry for each client allowed to access the system, each entry including a unique Internet protocol (IP) address for each client, the client table comprising IP addresses associated with one or more clients wherein each associated client has previously had IP data packets processed; and
a communications filter to:
retrieve a client limit from the global system registry;
determine a first Network address and a second Network address that are each associated with a first client attempting to access the system;
allow the first client to access the system if the first Network address is stored in the client table and the number of IP addresses in the client table is greater than or equal to the client limit or if the number of client table entries is less than the client limit;
allow the first client to access the system if the second Network address is stored in the client table and the number of IP addresses in the client table is greater than or equal to the client limit or if the number of client table entries is less than the client limit; and
store the first Network address and the second network address in the client table if the first client is allowed to access the system.

15. The computer system as recited in claim 14, wherein the Communications filter is further to allow the first client to access the system if the number of entries in the client table is greater than or equal to the client limit and if the first client has previously accessed the system.

16. The computer system as recited in claim 15, wherein the Communications filter is further to determine if the first client has previously accessed the system if either the first Network address or the second Network address is stored in the client table.

17. A communications protocol filter stored on a computer-readable storage medium, comprising processor-executable instructions that, when executed on a processor, perform the following steps:
monitoring communications protocol data packets transmitted from one or more clients to a server;
obtaining a first Network address from a communications protocol data packet transmitted by a first client;
processing communications protocol data packets from the first client if a first Network address that is uniquely associated with the client is stored in a client table, the client table comprising Network addresses associated with one or more clients wherein each associated client has previously had communication protocol data packets processed;
retrieving a client limit value from a client limit field if the first Network address is not stored in the client table, the client limit value indicating a maximum number of unique clients for which communications protocol data packets can be processed;
determining if the first client is represented in the client table by a second Network address that is different from the first Network address if the number of Network addresses in the client table is greater than or equal to the client limit value; and
processing communications protocol data packets from the first client if the second network address is found in the client table.

18. The communications protocol filter as recited in claim 17, further comprising processor-executable instructions that, when executed on a processor, perform the following steps:
storing the first Network address in the client table.

19. The communications protocol filter as recited in claim 17, further comprising processor-executable instructions that, when executed on a processor, perform the following steps:
removing the second Network address from the client table; and
inserting the first Network address into the client table.

* * * * *